(No Model.)
E. C. SHERWIN.
HARROW.
No. 349,006. Patented Sept. 14, 1886.
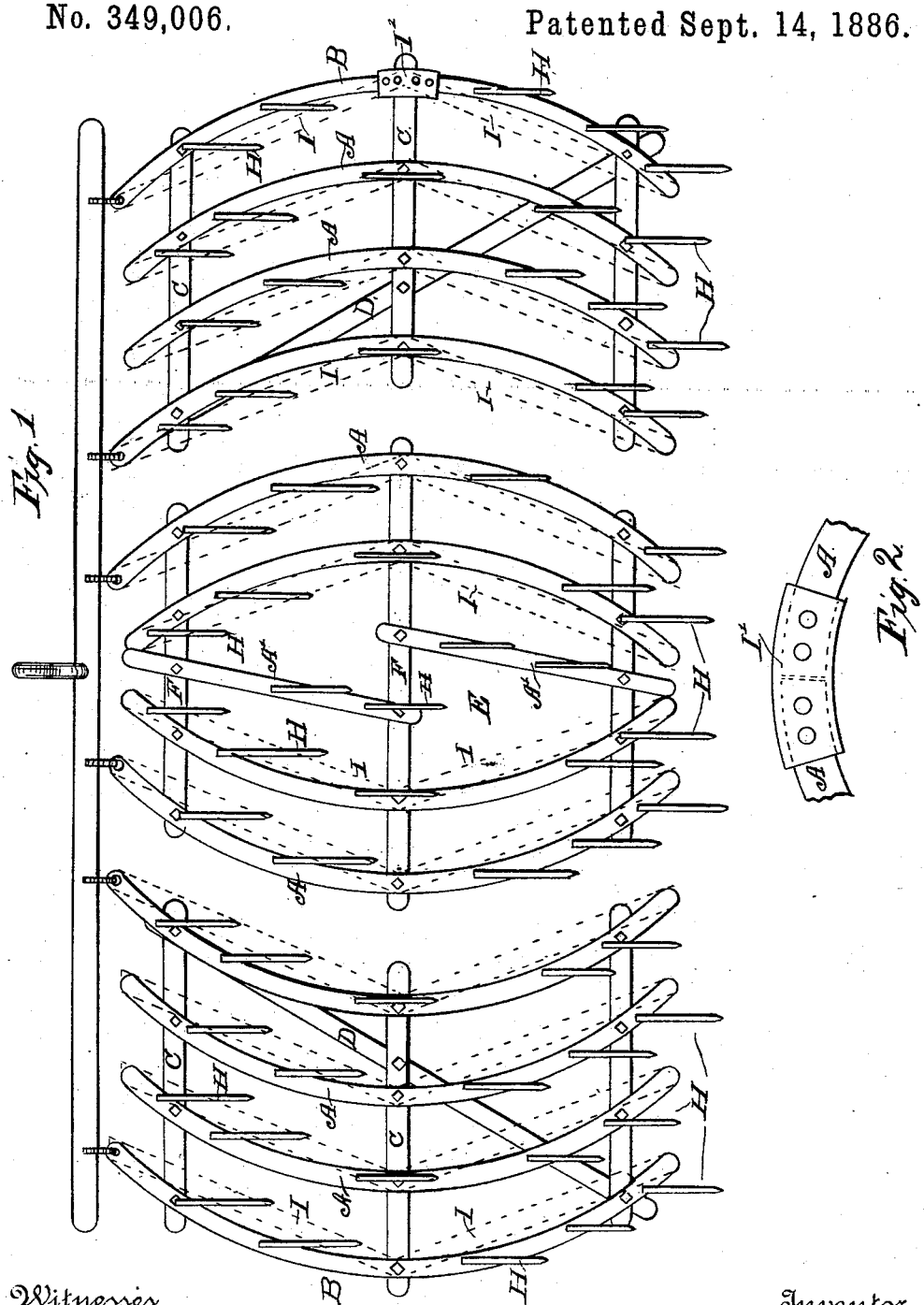
Witnesses
Susie B. Sater
R. W. Bishop
Inventor
Edwin C. Sherwin
By his Attorneys
R.S. & A.F. Lacey

UNITED STATES PATENT OFFICE.

EDWIN C. SHERWIN, OF BRANDON, WISCONSIN.

HARROW.

SPECIFICATION forming part of Letters Patent No. 349,006, dated September 14, 1886.

Application filed May 17, 1886. Serial No. 202,444. (No model.)

*To all whom it may concern:*

Be it known that I, EDWIN C. SHERWIN, a citizen of the United States, residing at Brandon, in the county of Fond du Lac and State of Wisconsin, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in an improved harrow which is so constructed as to prevent the teeth from "tracking," and to cause the sections of the harrow to run perfectly straight, by preventing them from swinging to one side while in operation, and in which the teeth are so arranged as to prevent the harrow from clogging, all as will be hereinafter fully described and claimed.

Referring to the accompanying drawings, Figure 1 is a bottom plan view of my improved harrow, showing in full lines the semicircular or curved tooth-bars, and showing in dotted lines the bent tooth-bars, which may be employed in place of the curved bars with the same result; and Fig. 2 is a detail view of the casting which connects the meeting ends of the two short pieces out of which the tooth-bars may be constructed.

The same letters of reference indicate corresponding parts in both the figures.

Referring to the several parts by letter, A A represent the tooth-bars of my improved harrow, these being made either in a semicircular or curved form, as shown in full lines in Fig. 1, or in the bent form shown in the same view. The two side sections, B B, of the harrow are preferably formed with the curved tooth-bars arranged in each of the said sections parallel to each other, with their concave sides toward the center of the harrow, the tooth-bars of each of the said sections being connected by the cross-pieces C and the inclined braces D, as shown, which serve to hold the tooth-bars firmly in their parallel positions. The central section, E, has two parallel curved tooth-bars on each side of its center, each pair of bars having their concave sides toward the center of the said section, while in the center of this section are arranged the two short inclined tooth-bars A' A', all of these tooth-bars being connected and held in their operative positions by the three cross-pieces F. It will be seen by reference to the drawings that the forward and rear ends of each curved tooth-bar are in the same straight line, while the body of each bar is curved in the arc of a circle. It will be seen that by this construction the rear half of each tooth-bar will work against or serve to counteract the tendency of the forward half of the tooth-bar, so as to hold the tooth-bars and the harrow perfectly straight while in operation, preventing the possibility of its swinging to one side, and effectually preventing the teeth from tracking one another—that is to say, preventing the rear teeth from running in the track of the forward teeth, which frequently occurs where the usual straight tooth-bars are used. In the side sections of the harrow, where the tooth-bars are arranged parallel to each other, the tendency of the teeth in the forward half of the tooth-bars and of the sections is to run or track in an inward direction, while the tendency of the teeth in the rear half of the tooth-bars and the sections is to track in an outward direction. Thus one half of each section counteracts the tracking tendency of its other half, the result being that the sections and the harrow run perfectly straight, without any tracking whatever. The bars of one side section, inclined toward the center of the harrow, further counterbalance the bars of the other section, which are also inclined toward the center of the harrow. The middle section, as shown, has the two bars on one side of its central line inclined toward the two bars of the other side, the bars on the opposite sides thus counteracting all tendency toward swinging or tracking. The teeth H are arranged in one tooth-bar three in front of the middle of the said bar and two to the rear of the middle line, while in the next bar they are arranged two in front and three to the rear of the central line, the object of thus reversing the order of the teeth being to effectually prevent the harrow from clogging.

When desired, the curved tooth-bars may be replaced by the tooth-bars formed with two straight portions, I, or halves, having their inner beveled ends meeting at an angle, as shown in dotted lines in Fig. 1, this form of inclined bar being the equivalent and producing exactly the same results as the curved bars shown in full lines, the beveled meeting ends of the portions I being bolted to a metal casting or plate, I'; or this casting may be formed with sockets, in which the said ends fit and are bolted. The curved tooth-bars may also be made of short pieces, having their meeting ends bolted in or to the casting I', as shown in the detail view, Fig. 2 of the drawings.

From the foregoing description, taken in connection with the accompanying drawings, the construction, operation, and advantages of my improved harrow will be readily understood.

It will be seen that my improved harrow prevents all possibility of the teeth tracking, which is so liable to occur where straight tooth-bars are employed, and the peculiar arrangement of the teeth prevents the harrow from clogging.

Having thus described my invention, what I claim, and desire to secure by Letters Patent of the United States, is—

1. A harrow composed of a series of curved or inclined tooth-bars arranged with their concave faces toward the center of the harrow, a median and end cross-pieces connecting the series of bars, the short inclined tooth-bars located in the center of the harrow and arranged on opposite sides of the cross-piece, and secured at their inner ends to the median cross-piece and at their outer ends to the end cross-pieces, substantially as shown.

2. A harrow composed of the central section having the curved or inclined tooth-bars arranged with their concave sides toward the center of the harrow and the short inclined tooth-bars, arranged as described, and the side sections having the curved or inclined parallel tooth-bars, arranged as described, as and for the purpose herein set forth.

In testimony whereof I affix my signature in presence of two witnesses.

EDWIN C. SHERWIN.

Witnesses:
DAVID WHITTON,
CHARLES B. WHITTON.